(12) United States Patent
Boelter

(10) Patent No.: US 11,029,156 B2
(45) Date of Patent: Jun. 8, 2021

(54) AIRCRAFT MAGNETIC DECLINATOR SYSTEM

(71) Applicant: The Boeing Company, Chicago, IL (US)

(72) Inventor: Karen Deborah Hatcher Boelter, Venice, CA (US)

(73) Assignee: The Boeing Company, Chicago, IL (US)

( * ) Notice: Subject to any disclaimer, the term of this patent is extended or adjusted under 35 U.S.C. 154(b) by 358 days.

(21) Appl. No.: 16/215,338

(22) Filed: Dec. 10, 2018

(65) Prior Publication Data
US 2020/0182619 A1    Jun. 11, 2020

(51) Int. Cl.
*G01C 21/18*    (2006.01)

(52) U.S. Cl.
CPC .................... *G01C 21/18* (2013.01)

(58) Field of Classification Search
CPC ...................................... G01C 21/20
See application file for complete search history.

(56) References Cited

U.S. PATENT DOCUMENTS

| | | | | |
|---|---|---|---|---|
| 6,427,122 B1* | 7/2002 | Lin | ...... | G01C 21/165 342/26 B |
| 7,587,277 B1* | 9/2009 | Wells | ...... | G01C 21/165 701/510 |
| 9,341,478 B1* | 5/2016 | Scherer | ...... | G06T 15/20 |
| 10,209,076 B1* | 2/2019 | McNamara | ...... | G08G 5/0052 |
| 2003/0135327 A1* | 7/2003 | Levine | ...... | G01C 23/00 701/500 |
| 2010/0312519 A1* | 12/2010 | Huang | ...... | G01C 17/38 702/150 |
| 2011/0307213 A1* | 12/2011 | Zhao | ...... | G06F 1/1626 702/153 |
| 2013/0041610 A1* | 2/2013 | Waters | ...... | G01C 17/02 702/93 |
| 2017/0147006 A1* | 5/2017 | Yang | ...... | B64C 39/024 |

OTHER PUBLICATIONS

Daniel A Martinec, "ARINC 429", 2001 (Year: 2001).*
"Geomagnetic Calculators, Maps, Models and Software," National Centers for Environmental Information, NOAA, accessed Nov. 1, 2018, 2 pages, https://www.ngdc.noaa.gov/geomag/models.shtml.

* cited by examiner

*Primary Examiner* — Khoi H Tran
*Assistant Examiner* — Tristan J Greiner
(74) *Attorney, Agent, or Firm* — Yee & Associates, P.C.

(57) ABSTRACT

A method, apparatus, and system for adjusting inertial reference data. The inertial reference data is received from an inertial reference unit in an aircraft. Replacement magnetic navigation data is determined for the aircraft at a current position of the aircraft. Magnetic navigation data in the inertial reference data is replaced with the replacement magnetic navigation data for the aircraft to form adjusted inertial reference data. The adjusted inertial reference data is sent to a number of aircraft systems that use the adjusted inertial reference data during operation of the aircraft.

27 Claims, 8 Drawing Sheets

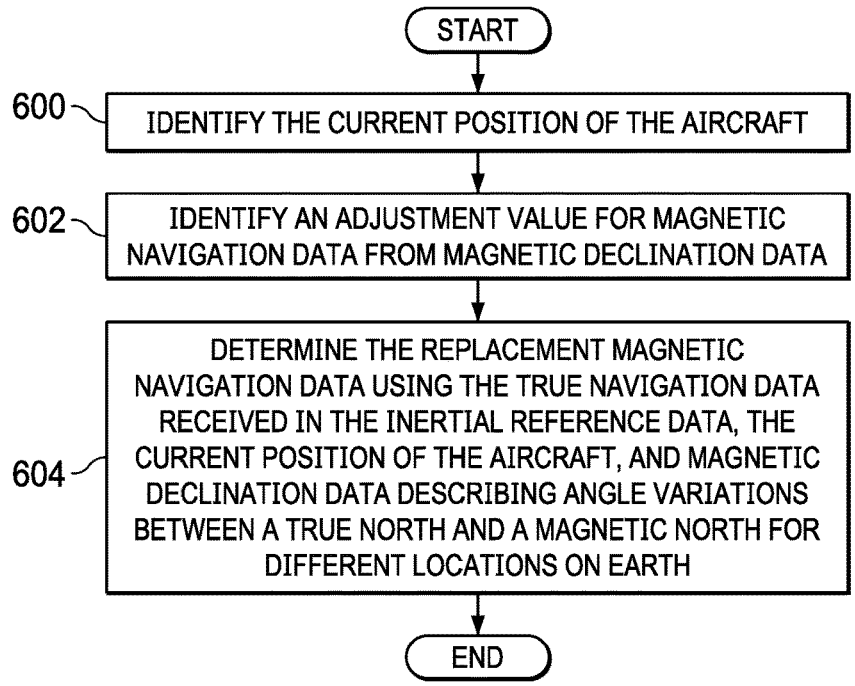
FIG. 6
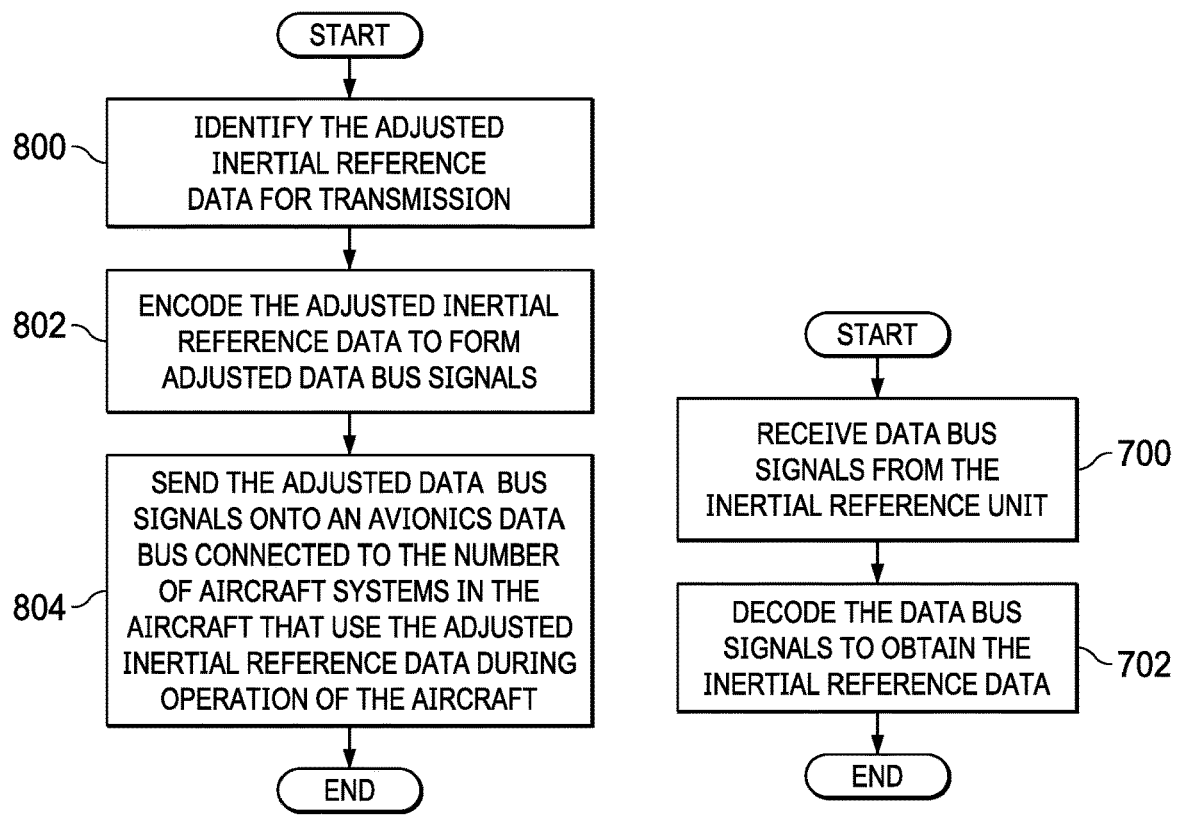
FIG. 8
FIG. 7

AIRCRAFT MAGNETIC DECLINATOR SYSTEM

BACKGROUND INFORMATION

1. Field

The present disclosure relates generally to aircraft and in particular, to a method, apparatus, and system for providing inertial reference data in an aircraft.

2. Background

The magnetic north pole of the Earth has been used as a reference for vehicles such as ships and aircraft. Currently, the magnetic north pole is still used as a primary heading reference in aeronautical infrastructure, aircraft, navigation aids, and flight procedures. One challenge is that the location of the magnetic north pole and the Earth's magnetic fields change over time in different locations on the Earth. For desired safe flight navigation, the aeronautical infrastructure, aircraft, navigation aids, and flight procedures are updated periodically to maintain references to magnetic north that are within regulatory requirements for heading accuracy.

Inertial reference units (IRUs) have been installed on aircraft. These units include components such as laser gyros and accelerometers that operate to calculate inertial reference data using a true north. This inertial reference data includes a true heading and a true track.

However, a magnetic north reference is still used in most flight operations. As a result, the inertial reference units are designed to convert true north values to magnetic north values to provide needed magnetic navigation data to operate the aircraft. In this manner, all of the aircraft operate using the same "north".

Current inertial reference units identify an angle bias. This angle bias is also referred to as magnetic variation, or magnetic declination, and identifies the angle between magnetic north and true north. The magnetic declination is in degrees and may be positive or negative depending on if magnetic north is east or west of true north. This magnetic declination is added to the true north data to obtain magnetic north data. The value of the angle used for the calculation is determined based on the current position of the aircraft and changes over time. As a result, the accuracy of the magnetic north data decreases in accuracy over time.

The magnetic declination values stored in the inertial reference units for calculating magnetic north are fixed and become outdated over time. Currently, the inertial reference units are updated with new values. An inertial reference unit in most cases is removed for an update to be performed. This update is performed by the manufacturer of the inertial reference unit. The manufacturer's charge for the update of the inertial reference unit is often greater than desired. Currently, the amount of time needed to update an inertial reference unit is greater than desired. Further, the cost of inertial reference units can be prohibitive enough such that not many spare inertial reference units are available for use while updates are made.

Therefore, it would be desirable to have a method and apparatus that take into account at least some of the issues discussed above, as well as other possible issues. For example, it would be desirable to have a method and apparatus that overcome a technical problem with the accuracy of magnetic navigation data calculated by inertial reference units.

SUMMARY

An embodiment of the present disclosure provides an inertial reference system comprising a magnetic declinator unit. The magnetic declinator unit receives inertial reference data from an inertial reference unit in the inertial reference system in an aircraft. The magnetic declinator unit determines replacement magnetic navigation data for the aircraft at a current position of the aircraft and replaces magnetic navigation data in the inertial reference data with the replacement magnetic navigation data for the aircraft to form adjusted inertial reference data. The magnetic declinator unit sends the adjusted inertial reference data to a number of aircraft systems that use the adjusted inertial reference data during operation of the aircraft.

Another embodiment of the present invention provides an aircraft magnetic declinator system comprising an input bus interface, an output bus, and a controller. The input bus is connectable to an output of an inertial reference unit in an aircraft, wherein the input bus interface receives a complementary differential bipolar return-to-zero transmission waveform. The output bus interface is connectable to an avionics data bus in the aircraft. The controller decodes the complementary differential bipolar return-to-zero transmission waveform to obtain inertial reference data comprising a current position of the aircraft, a true heading, a true track, a magnetic heading, and a magnetic track. The controller determines a replacement magnetic heading and a replacement magnetic track for the current position of the aircraft and replaces the magnetic heading and the magnetic track with the replacement magnetic heading and the replacement magnetic track to form adjusted inertial reference data. The controller encodes the adjusted inertial reference data to form an adjusted complementary differential bipolar return-to-zero transmission waveform and sends the adjusted complementary differential bipolar return-to-zero transmission waveform onto the avionics data bus in the aircraft.

Yet another embodiment of the present disclosure provides a method for adjusting inertial reference data. The inertial reference data is received from an inertial reference unit in an aircraft. Replacement magnetic navigation data is determined for the aircraft at a current position of the aircraft. Magnetic navigation data in the inertial reference data is replaced with the replacement magnetic navigation data for the aircraft to form adjusted inertial reference data. The adjusted inertial reference data is sent to a number of aircraft systems that use the adjusted inertial reference data during operation of the aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 is an illustration of a flowchart of a process for determining replacement magnetic navigation data in accordance with an illustrative embodiment;

FIG. 7 is an illustration of a flowchart of a process for decoding data bus signals in accordance with an illustrative embodiment;

FIG. 8 is an illustration of a flowchart of a process for encoding data bus signals in accordance with an illustrative embodiment;

DETAILED DESCRIPTION

The illustrative embodiments recognize and take into account one or more different considerations. For example, the illustrative embodiments recognize and take into account that the problem with the magnetic north changes with a frequency such that the accuracy of the values hardcoded into inertial reference units may only meet aircraft design tolerances for several years. For example, the illustrative embodiments recognize and take into account that the magnetic north for a particular location on Earth can change by several degrees per year. As a result, the illustrative embodiments recognize and take into account that without updates, the magnetic north data generated by these inertial reference units can be inaccurate for most of the life of an aircraft.

The illustrative embodiments also recognize and take into account that the cost to remove inertial reference units from the aircraft and the cost charged by suppliers to update the inertial reference units with new magnetic declination values can be prohibitively expensive. Further, the illustrative embodiments recognize and take into account that currently, suppliers of inertial reference units are limited and delays with updating these units can result in inertial reference units being outside of the aircraft for three or more months. The illustrative embodiments recognize and take into account that this time outside of the aircraft includes shop time for updates and time for passing customs. The illustrative embodiments recognize and take into account that with the expense and limited availability of spare inertial reference units, these units are slowly rotated off aircraft for updates. Further, the illustrative embodiments recognize and take into account that for many large operators, an update can take between 5-10 years.

The illustrative embodiments also recognize and take into account that for some newer aircraft, updates are not available for the hardcoded values for magnetic declination data. As a result, these aircraft can be limited in the airports at which they can operate.

Thus, the illustrative embodiments provide a method, apparatus, and system for adjusting inertial reference data that increases the accuracy of the inertial reference data. In one illustrative example, inertial reference data is received from an inertial reference unit in an aircraft. Replacement magnetic navigation data is determined for the aircraft at the current position of the aircraft. Magnetic navigation data in the inertial reference data is replaced with the replacement magnetic navigation data for the aircraft to form adjusted inertial reference data. The adjusted inertial reference data is sent to a number of aircraft systems that use the adjusted inertial reference data during operation of aircraft. The magnetic navigation data can be, for example, a magnetic heading and a magnetic track.

Figure 1:
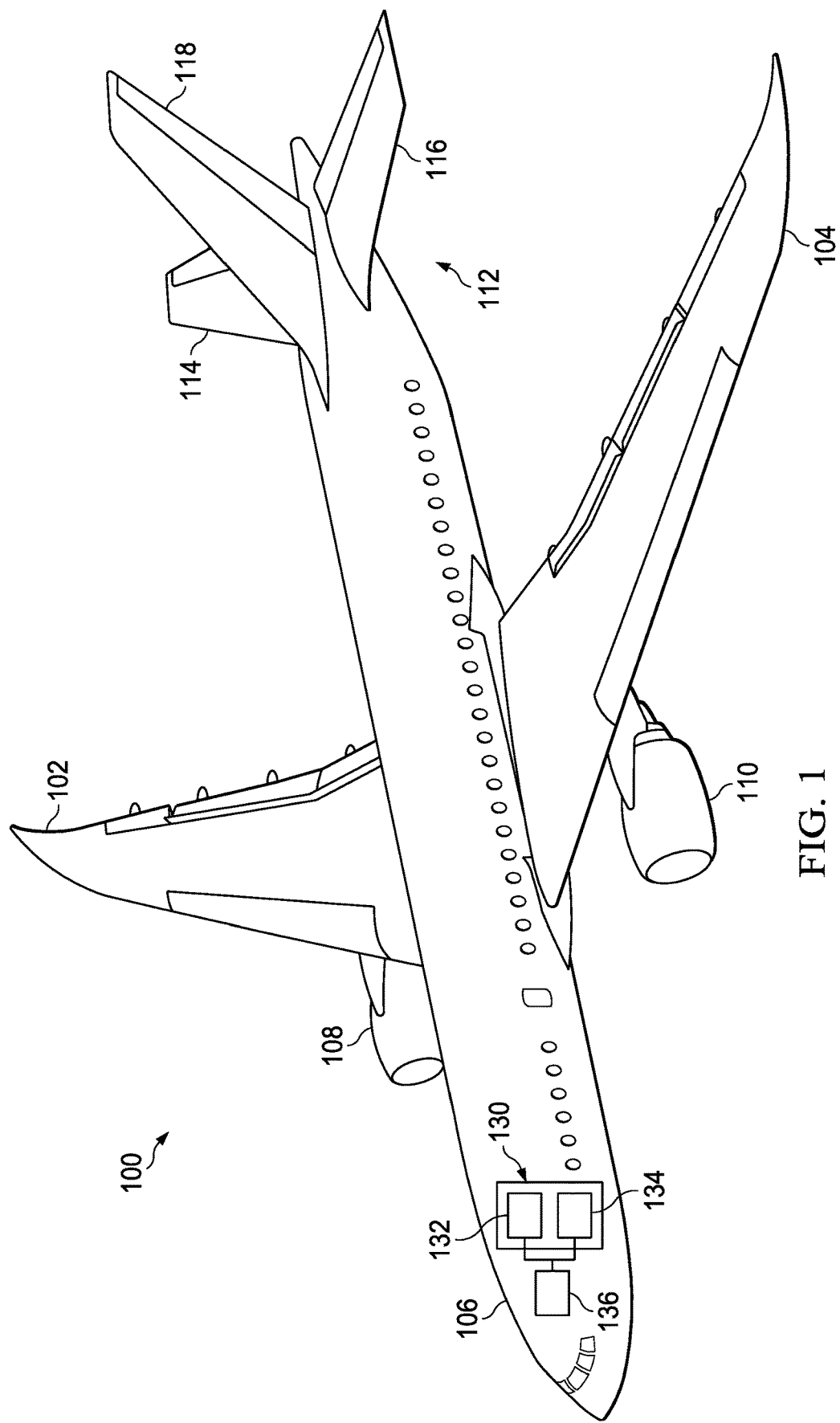
FIG. 1 is a pictorial illustration of an aircraft in accordance with an illustrative embodiment.

With reference now to the figures, and in particular, with reference to FIG. 1, a pictorial illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which inertial reference system 130 may be implemented in accordance with an illustrative embodiment. In this illustrative example, inertial reference system 130 includes inertial reference unit 132 and magnetic declinator unit 134. In this illustrative example, inertial reference unit 132 generates inertial reference data. The inertial reference data includes magnetic navigation data. This magnetic navigation data is used by aircraft systems 136 during operation of aircraft 100. For example, this inertial reference data can be used by an autopilot in aircraft systems 136 to control the trajectory of aircraft 100 to follow a selected route or maintain a desired heading. Further, this inertial reference data can be used in navigation displays in aircraft systems 136. For example, the magnetic navigation data can be used to display a heading, track, or both for aircraft 100 on a display system to a pilot.

In this illustrative example, the use of magnetic declinator unit 134 does not alter the operation of inertial reference unit 132. In other words, changes to inertial reference unit 132 are unnecessary in the illustrative examples. Inertial reference unit 132 can operate as it normally does in providing inertial reference data.

As depicted, magnetic declinator unit 134 intercepts inertial reference data generated by inertial reference unit 132. In this example, inertial reference data include magnetic navigation data calculated by inertial reference unit 132. This magnetic navigation data is calculated using magnetic declination data that is stored or hardcoded in inertial reference unit 132.

Magnetic declinator unit 134 replaces magnetic navigation data in the inertial reference data with replacement magnetic navigation data to form adjusted inertial reference data. The replacement navigation data is calculated by magnetic declinator unit 134 based on the current position of aircraft 100.

In this illustrative example, magnetic declinator unit 134 contains magnetic declination data describing angle variations between the true north and magnetic north for different locations on Earth over time. This magnetic declination data is used to generate replacement magnetic navigation data from true navigation data that is received in inertial reference data from inertial reference unit 132.

The adjusted inertial reference data is sent to the aircraft systems 136. In this illustrative example, adjusted inertial reference data is sent using the same source destination identifier (SDI) as the inertial reference unit 132 with negligible time delay. Aircraft systems 136 do not need any changes to use the adjusted inertial reference data output by magnetic declinator unit 134.

In this manner, magnetic declinator unit 134 operates in a manner that is transparent with respect to inertial reference unit 132 and aircraft systems 136. Further, magnetic declinator unit 134 is designed to be more easily updated as compared to inertial reference unit 132. Removal of magnetic declinator unit 134 is unnecessary.

Instead, the magnetic declination data is more easily updated with magnetic declinator unit 134. For example, magnetic declination data may be an aircraft part in magnetic declinator unit 134. A new aircraft part with current or new magnetic declination data can be uploaded to inertial reference unit 132. For example, a flash drive can be connected to magnetic declinator unit 134.

In another example, magnetic declinator unit 134 can establish a connection with a computer system that sends updated magnetic declination data. This connection can be a wired or a wireless connection.

Thus, reliance on suppliers of inertial reference systems can be reduced. By having a separate component such as magnetic declinator unit 134, updates to magnetic declination data can be performed more frequently and easily without having to remove inertial reference unit 132 from an inertial reference system 130 for updates. In this illustrative example, the update can also be performed by uploading the necessary data to magnetic declinator unit 134.

Figure 2:
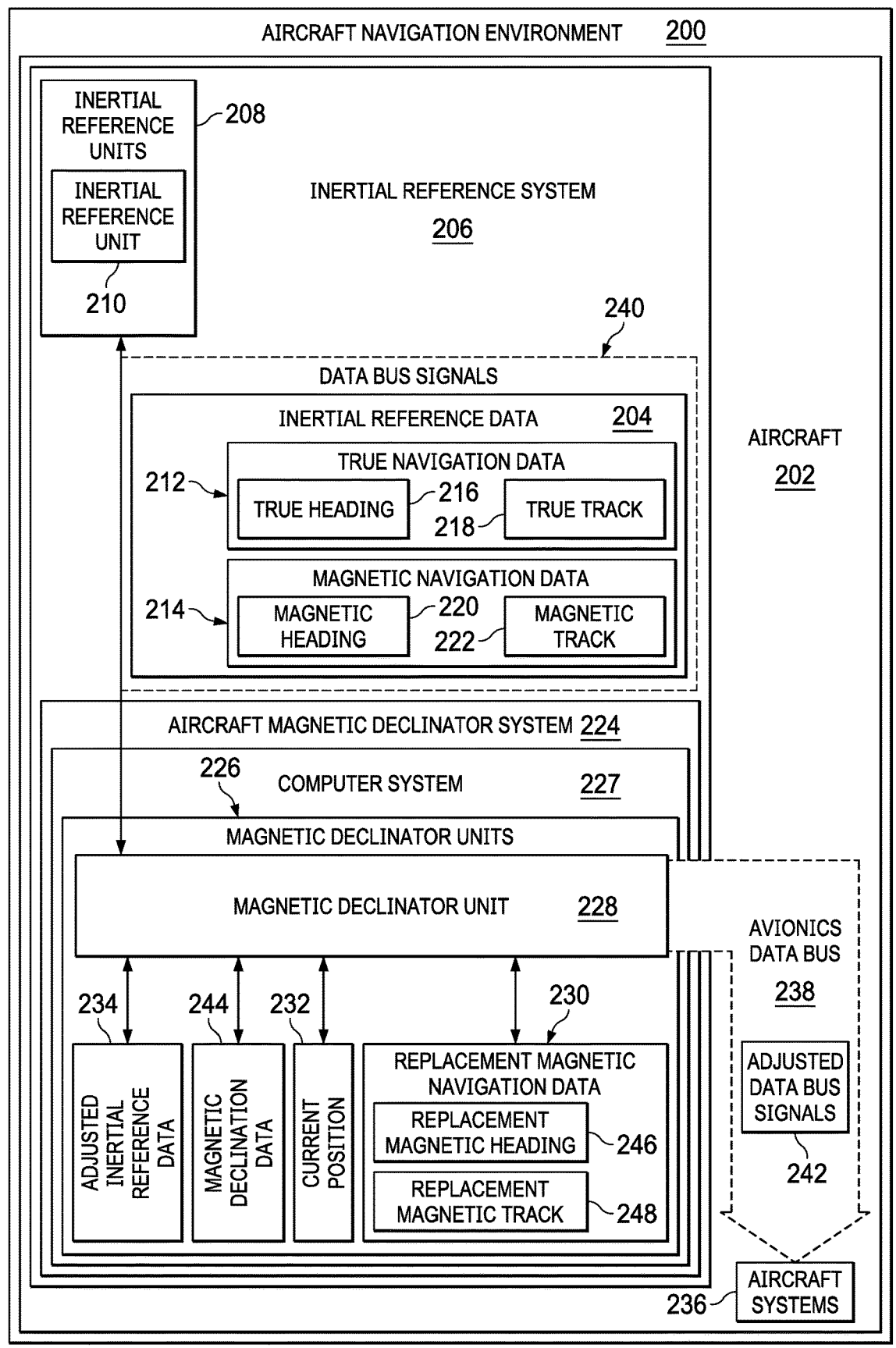
FIG. 2 is an illustration of a block diagram of an aircraft navigation environment in accordance with an illustrative embodiment.

With reference next to FIG. 2, an illustration of a block diagram of an aircraft navigation environment is depicted in accordance with an illustrative embodiment. In this illustrative example, aircraft navigation environment 200 is an environment in which aircraft 202 operates.

During operation and in particular during flight of aircraft 202, inertial reference data 204 is generated by inertial reference system 206. In this illustrative example, inertial reference data 204 comprises a current latitude, a current longitude, a true track, a true heading, a magnetic heading, a magnetic track, or other suitable data.

In this illustrative example, inertial reference system 206 is a hardware system and can include software. Inertial reference system 206 comprises a group of inertial reference units 208.

As used herein, a "group of," when used with reference to items, means one or more items. For example, a group of inertial reference units 208 is one or more of inertial reference units 208.

For example, inertial reference unit 210 in the group of inertial reference units 208 generates inertial reference data 204. In this illustrative example, inertial reference unit 210 is a type of inertial sensor. Inertial reference unit 210 may include gyroscopes, a laser ring gyro, an accelerometer, or other components to determine a change in rotational attitude in translational position over a period of time.

In this illustrative example, inertial reference data 204 includes true navigation data 212 and magnetic navigation data 214. True navigation data 212 includes, for example, at least one of true heading 216 or true track 218. In this particular example, magnetic navigation data 214 is any data that is calculated using a magnetic declination angle. Magnetic navigation data 214 includes, for example, at least one of magnetic heading 220 magnetic track 222, or other suitable magnetic navigation data that can be calculated by inertial reference unit 210.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As depicted, the heading of aircraft 202 is the direction pointed to by the nose of aircraft 202. This direction, the heading, is described as an angle relative to a true north for true heading 216 and a magnetic north for magnetic heading 220. The heading can differ from the track that aircraft 202 moves on depending on factors such as forward speed, wind speed, or other factors. This information can be used to perform course corrections.

The track of aircraft 202 is the direction of movement of the aircraft. This directional movement can be described relative to a true north for true track 218 and a magnetic north for magnetic track 222.

In this illustrative example, magnetic navigation data 214 generated by inertial reference unit 210 can be out of tolerance from a desired level accuracy. As depicted, inertial reference system 206 can include aircraft magnetic declinator system 224. Aircraft magnetic declinator system 224 is a hardware system and can include software and can operate to increase the accuracy of magnetic navigation data 214.

As depicted, aircraft magnetic declinator system 224 comprises a group of magnetic declinator units 226, which are devices that can be implemented in computer system 227. Computer system 227 is a physical hardware system and includes one or more data processing systems. These one or more data processing systems can be used to implement magnetic declinator units 226. When more than one data processing system is present in computer system 227, those data processing systems are in communication with each other using a communications medium. The communications medium can be a network. In other illustrative examples, communications medium can be an avionics data bus. The data processing systems can be selected from at least one of a computer, a server computer, a tablet computer, a line replaceable unit, or some other suitable data processing system that can be used to implement magnetic declinator units 226.

In this illustrative example, aircraft magnetic declinator system 224 operates to increase the accuracy of magnetic navigation data 214 generated by inertial reference units 208. As depicted, magnetic declinator unit 228 in the group of magnetic declinator units 226 operates to perform various operations in generating replacement magnetic navigation data 230 for use in place of magnetic navigation data 214.

In this illustrative example, magnetic declinator unit 228 operates to receive inertial reference data 204 from inertial reference unit 210 in inertial reference system 206 in aircraft 202. As depicted in this example, magnetic declinator unit 228 determines replacement magnetic navigation data 230 for aircraft 202 at current position 232 of aircraft 202 and replaces magnetic navigation data 214 in inertial reference data 204 with replacement magnetic navigation data 230 for aircraft 202 to form adjusted inertial reference data 234.

Magnetic declinator unit 228 sends adjusted inertial reference data 234 to a number of aircraft systems 236 in aircraft 202 that use adjusted inertial reference data 234 during operation of aircraft 202. As used herein, a "number of," when used with reference to items, means one or more items. For example, a number of aircraft systems 236 is one or more of aircraft systems 236.

In this illustrative example, the number of aircraft systems 236 can include at least one of a navigation system, an autopilot, a navigation display, a radio magnetic indicator, a weather radar, a traffic collision avoidance system (TCAS), a heads up display (HUD) system, or other suitable components or devices.

In this illustrative example, magnetic declinator unit 228 is located between inertial reference unit 210 and avionics data bus 238. As depicted, a number of aircraft systems 236 is connected to avionics data bus 238. In this illustrative example, avionics data bus 238 can take a number of different forms. For example, avionics data bus can be selected from a group comprising an Aeronautical Radio, Incorporated (ARINC) 429 data bus, a MIL-STD-1553 data bus, and other suitable data bus types for use in aircraft.

Magnetic declinator unit 228 receives data bus signals 240 from inertial reference unit 210 and decodes data bus signals 240 to obtain inertial reference data 204. In sending adjusted inertial reference data 234 to the number of aircraft systems 236 that use adjusted inertial reference data 234 during operation of aircraft 202, magnetic declinator unit 228 encodes adjusted inertial reference data 234 to form adjusted data bus signals 242 and sends adjusted data bus signals 242 onto avionics data bus 238 connected to the number of aircraft systems 236 in aircraft 202 that use adjusted inertial reference data 234 during operation of the aircraft 202.

In determining replacement magnetic navigation data 230 for aircraft 202 at current position 232 of aircraft 202, magnetic declinator unit 228 calculates replacement magnetic navigation data 230 using true navigation data 212, current position 232 of aircraft 202, and magnetic declination data 244 describing angle variations between a true north and a magnetic north for different locations on Earth over time. In other words, the difference between magnetic north and true north shifts over time. As a result, magnetic declination data 244 can become less accurate over time. In this illustrative example, magnetic declination data 244 comprises at least one of a World Magnetic Model, an International Geomagnetic Reference Field model, or other suitable models for data collections.

In this illustrative example, replacement magnetic navigation data 230 comprises replacement magnetic heading 246 and replacement magnetic track 248, and true navigation data 212 comprises true heading 216 and true track 218. Replacement magnetic heading 246 replaces magnetic heading 220 in magnetic navigation data 214. Replacement magnetic heading 246 is determined using true heading 216 and magnetic declination data 244. Replacement magnetic track 248 replaces magnetic track 222 in magnetic navigation data 214. Replacement magnetic track 248 is determined using true track 218 and magnetic declination data 244.

Magnetic declinator unit 228 is implemented using hardware and can also include software, firmware, or a combination thereof. When software is used, the operations performed by magnetic declinator unit 228 can be implemented in program code configured to run on hardware in magnetic declinator unit 228, such as a processor unit. When firmware is used, the operations performed by magnetic declinator unit 228 can be implemented in program code and data and stored in persistent memory to run on a processor unit in magnetic declinator unit 228. When hardware is employed, the hardware can include circuits that operate to perform the operations in magnetic declinator unit 228.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Figure 3:
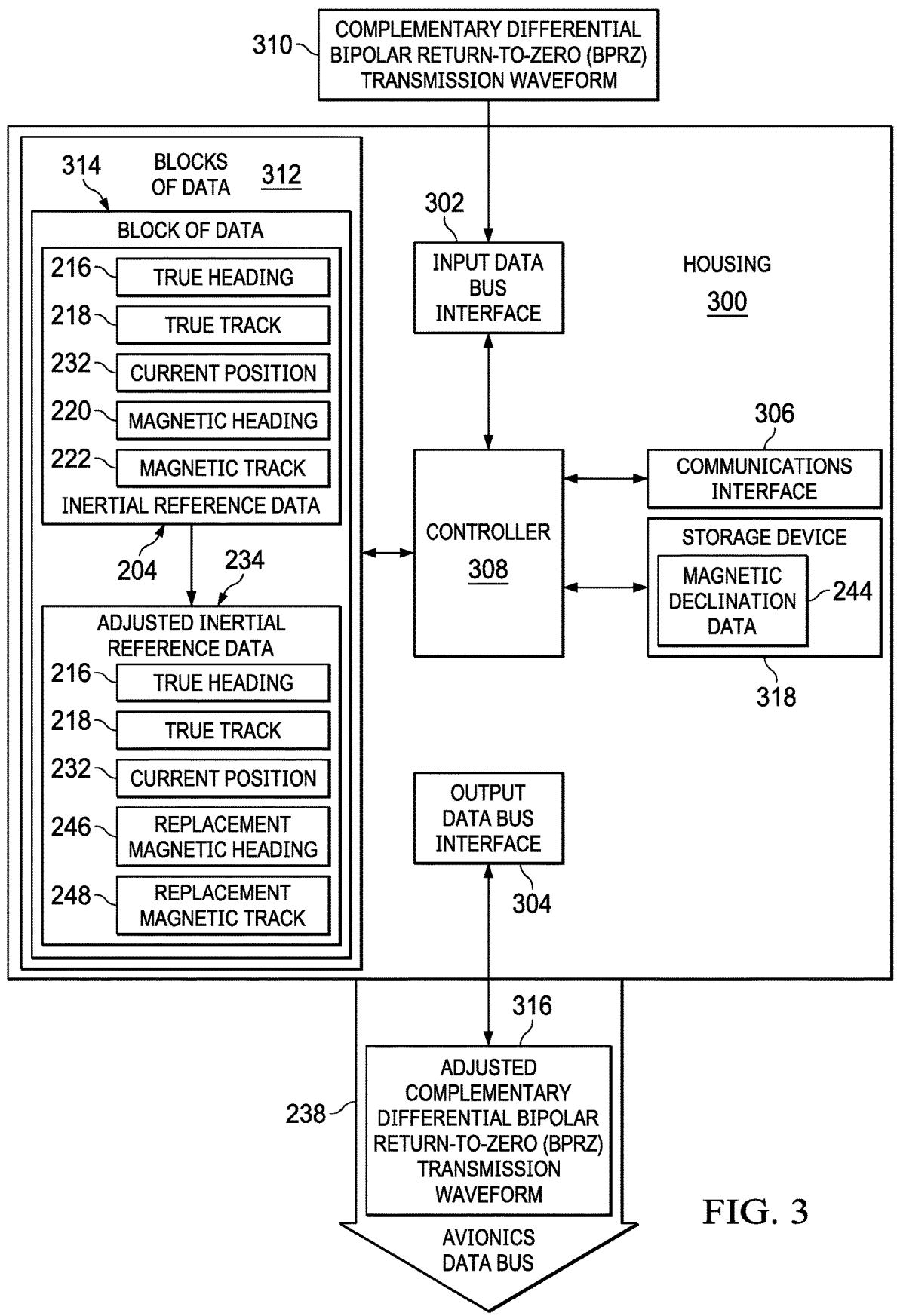
FIG. 3 is an illustration of a block diagram of a magnetic declinator unit in a magnetic declinator system in accordance with an illustrative embodiment.

Turning next to FIG. 3, illustration of a block diagram of a magnetic declinator unit in a magnetic declinator system is depicted in accordance with an illustrative embodiment. In the illustrative examples, the same reference numeral may be used in more than one figure. This reuse of a reference numeral in different figures represents the same element in the different figures.

As depicted, an example of components that can be used to implement magnetic declinator unit 228 is depicted in this figure. In this illustrative example, magnetic declinator unit 228 comprises housing 300. Housing 300 can be hermetically sealed in this illustrative example. Further, the design of housing 300 along with the components used in magnetic declinator unit 228 can be selected to reduce cooling requirements and in some cases eliminate the need for cooling systems.

Further, housing 300 can be selected to have a size and dimensions that increase the ease at which magnetic declinator unit 228 can be at least one of located, found, replaced, or accessed in an electrical equipment bay in aircraft 202. Housing 300 can be comprised of material selected from at least one of a metal, aluminum, steel, a composite, a plastic, a polycarbonate, or some other suitable material.

As depicted, input data bus interface 302, output data bus interface 304, and communications interface 306 are located in or on housing 300. Additionally, controller 308 is located in housing 300.

As depicted, input data bus interface 302 is connectable to an output of inertial reference unit 210 in aircraft 202. In this illustrative example, input data bus interface 302 is configured to receive a complementary differential bipolar returnto-zero (BPRZ) transmission waveform 310. Output data bus interface 304 is connectable to avionics data bus 238 in the aircraft 202.

Controller 308 is a hardware device and can include software. Controller 308 can be, for example, a processor unit, an application specific integrated circuit (ASIC), a programmable logic device, or some other suitable type of hardware configured to perform a number of operations.

In this depicted example, controller 308 decodes the complementary differential bipolar return-to-zero (BPRZ) transmission waveform 310 to obtain inertial reference data 204, which comprises current position 232 of aircraft 202, true heading 216, true track 218, magnetic heading 220, and magnetic track 222. In this illustrative example, magnetic heading 220 and magnetic track 222 are magnetic navigation data 214 generated by inertial reference unit 210.

As depicted, inertial reference data 204 is organized into blocks of data 312, and controller 308 stores blocks of data 312. In this illustrative example, controller 308 replaces magnetic heading 220 and magnetic track 222 in block of data 314 in blocks of data 312 with the replacement magnetic heading 246 and replacement magnetic track 248.

Further, controller 308 determines replacement magnetic heading 246 and replacement magnetic track 248 from current position 232 of aircraft 202. In this illustrative example, replacement magnetic heading 246 and replacement magnetic track 248 is replacement magnetic navigation data 230 that replaces magnetic heading 220 and magnetic track 222 in magnetic navigation data 214 in inertial reference data 204 decoded from complementary differential bipolar return-to-zero (BPRZ) transmission waveform 310.

As depicted, in determining replacement magnetic heading 246 and replacement magnetic track 248 using current position 232 of aircraft 202, controller 308 determines replacement magnetic heading 246 and replacement magnetic track 248 using true heading 216, true track 218, current position 232 of aircraft 202, and magnetic declination data 244 describing angle variations between true north and magnetic north for locations on Earth over time.

Controller 308 replaces magnetic heading 220 and magnetic track 222 with replacement magnetic heading 246 and replacement magnetic track 248 to form adjusted inertial reference data 234. In this illustrative example, controller 308 encodes adjusted inertial reference data 234 to form adjusted complementary differential bipolar return-to-zero (BPRZ) transmission waveform 316 and sends adjusted complementary differential bipolar return-to-zero (BPRZ) transmission waveform 316 onto avionics data bus 238 in aircraft 202.

In encoding adjusted inertial reference data 234, controller 308 encodes block of data 314 containing replacement magnetic heading 246 and replacement magnetic track 248 to form adjusted differential bipolar return-to-zero (BPRZ) transmission waveform 316.

In this illustrative example, magnetic declination data 244 is stored in storage devices 318 in housing 300. Magnetic declination data 244 can be updated using communications interface 306.

As depicted, communications interface 306 can take a number of forms. For example, communications interface 306 can be selected from at least one of universal serial bus interface, a wireless transceiver, a network interface adapter, or some other suitable component. Communications interface 306 enables easier updating in configuration of magnetic declination values.

Figure 4:
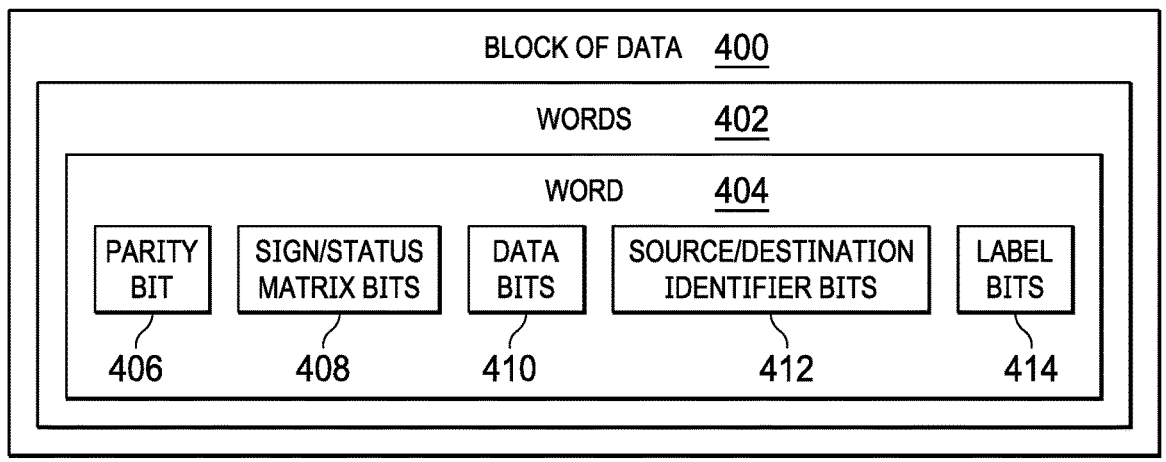
FIG. 4 is an illustration of a block diagram of inertial reference data in a block of data in accordance with an illustrative embodiment.

With reference next to FIG. 4, an illustration of a block diagram of inertial reference data in a block of data is depicted in accordance with an illustrative embodiment. In this illustrative example, block of data 400 is an example of one implementation for block of data 314 in FIG. 3.

In this illustrative example, block of data 400 contains words 402. Each word in words 402 contains a piece of inertial reference data. In this illustrative example, word 404 is in an ARINC 429 word format. Word 404 includes parity bit 406, sign/status matrix (SSM) bits 408, data bits 410, source/destination identifier (SDI) bits 412, and labeled bits 414. In this example, parity bit 406 is the most significant bit and labeled bits 414 are the least significant bits in word 404.

Parity bit 406 is a single bit, bit 31, and is used indicate whether the word was transmitted without error. Sign/status matrix bits 408 contains two bits, bit 30 and bit 31, that are used to indicate status such as normal operation (NO), functional test (FT), failure warning (FW), and no computed data (NCD).

In this illustrative example, replacement magnetic navigation data is calculated and replaced when inertial reference data is labeled as normal operation (NO).

In this illustrative example, the inertial reference data of interest is true heading, true track, latitude, longitude, and magnetic navigation data. The labels for other inertial reference data are not examined and not used to determine whether to calculate replacement magnetic navigation data. The inertial reference data in word 404 is sent onto the avionics data bus as received from the inertial reference unit without a change when a label of normal operation is absent for the inertial reference data words of interest 404.

Data bits 410 are bits 11 through 29, and contain the data being transmitted in word 404. Source/destination identifier bits 412 comprises two bits, bit 9 and bit 10. Source/destination identifier bits 412 can identify the intended receiver of the word 404 or the device or component transmitting word 404. In this example, source/destination identifier bits 412 are a source destination identifier (SDI).

In this illustrative example, labeled bits 414 are 8 bits, bit 1 through bit 8. These label bits are used to identify the type of data sent in this illustrative example. For example, labeled bits 414 can have values that indicate type of data in data bits 410. For example, 310 is latitude, 311 is longitude, 313 is true track, 314 is true heading, 317 is magnetic track, and 320 is magnetic heading.

In one illustrative example, one or more technical solutions are present that overcome a technical problem with the accuracy of magnetic navigation data calculated by inertial reference units. As a result, one or more technical solutions can provide a technical effect enabling calculating magnetic navigation data 214 using inertial reference data 204 and magnetic declination data 244 in a magnetic declinator unit 228 located outside of inertial reference unit 210.

Computer system 227 can be configured to perform at least one of the steps, operations, or actions described in the different illustrative examples using software, hardware, firmware or a combination thereof. As a result, computer system 227 operates as a special purpose computer system in which magnetic declinator unit 228 in computer system 227 enables providing magnetic navigation data with a desired level accuracy. In particular, magnetic declinator unit 228 transforms computer system 227 into a special purpose computer system as compared to currently available general computer systems that do not have magnetic declinator unit 228.

The illustration of an aircraft navigation environment 200 in FIGS. 2-4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, magnetic declinator unit 228 can include additional components in addition to or in place of the components shown in FIG. 3. For example, magnetic declinator unit 228 can be a line replaceable unit (LRU) separate from an inertial reference unit. In this example, magnetic declinator unit 228 includes Built-in-Test Equipment (BITE) for self-monitoring and line maintenance, a display to communicate BITE results, operational modes, part number(s), magnetic model, active year, and other information. Magnetic declinator unit 228 can operate in a fully redundant manner with no negative impact to exiting inertial reference unit operation.

Figure 5:
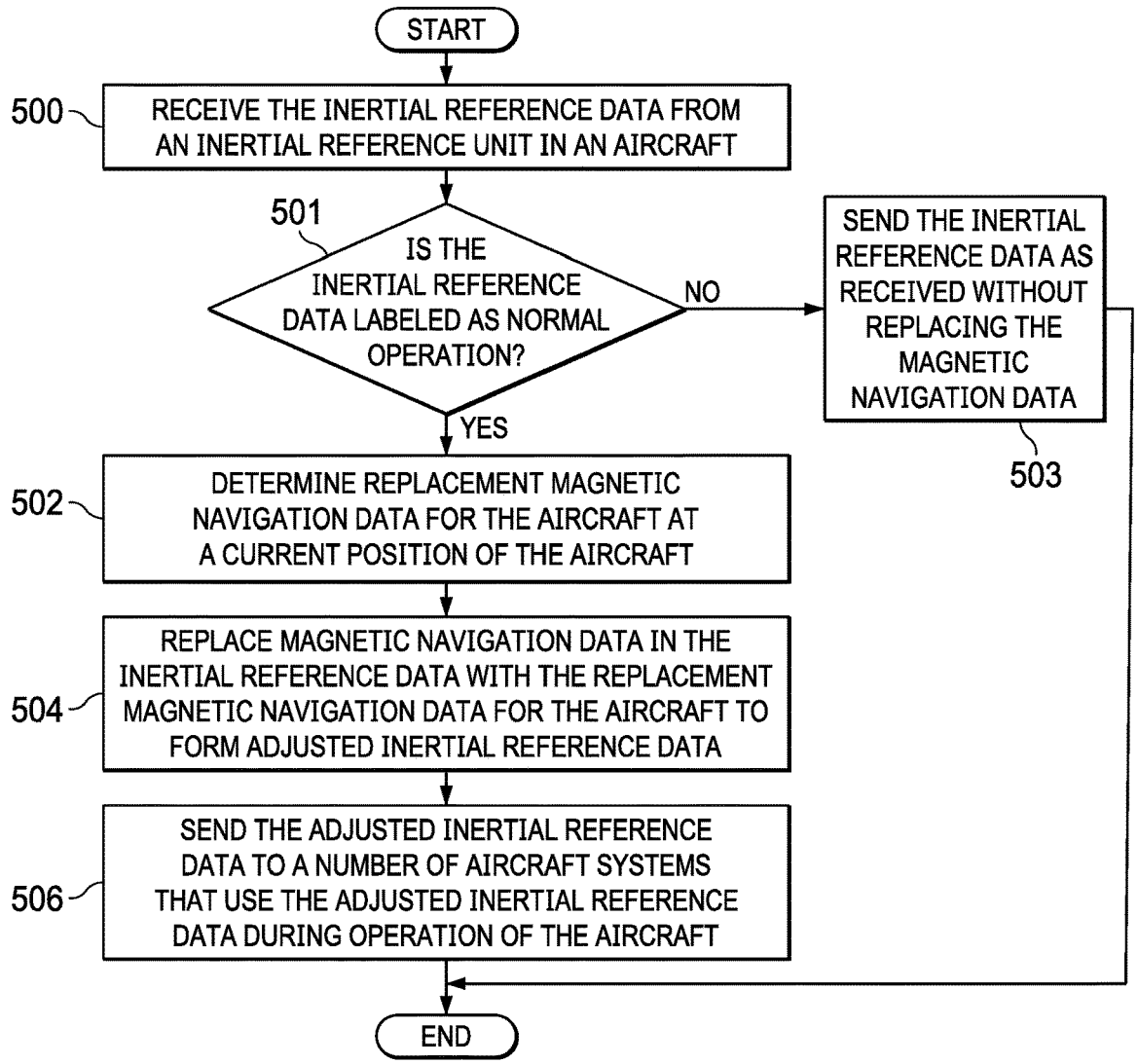
FIG. 5 is an illustration of a flowchart of a process for adjusting inertial reference data in accordance with an illustrative embodiment.

Turning next to FIG. 5, an illustration of a flowchart of a process for adjusting inertial reference data is depicted in accordance with an illustrative embodiment. The process illustrated in FIG. 5 can be implemented in hardware, software, or both. When implemented in software, the process can take the form of program code that is run by one of more processor units located in one or more hardware devices in one or more computer systems. For example, the process can be implemented in magnetic declinator unit 228 in computer system 227 in FIG. 2.

In this illustrative example, inertial reference data originating from an inertial reference unit can be intercepted by this process. The inertial reference data can be updated with correct or more accurate magnetic navigation data to form adjusted inertial reference data. The adjusted inertial reference data can then be transmitted to the intended aircraft systems for use in operating aircraft.

The process begins by receiving the inertial reference data from an inertial reference unit in an aircraft (operation 500)

A determination is made as to whether the inertial reference data is labeled as normal operation (operation 501). In operation 501, the determination can be made with respect to particular pieces of the inertial reference data. For example, the determination can be made by determining whether the true navigation data and the magnetic navigation data (e.g. inertial reference data) are labeled as normal operation.

When the inertial reference data is labeled as normal operation, the process determines replacement magnetic navigation data for the aircraft at a current position of the aircraft (operation 502). The process replaces magnetic navigation data in the inertial reference data with the replacement magnetic navigation data for the aircraft to form adjusted inertial reference data (operation 504).

The process sends the adjusted inertial reference data to a number of aircraft systems that use the adjusted inertial reference data during operation of the aircraft (operation 506). In operation 506, the process can encode the adjusted inertial reference data to form adjusted data bus signals. These adjusted data bus signals are sent onto an avionics data bus connected to the number of aircraft systems in the aircraft that use the adjusted inertial reference data during operation of the aircraft. The process terminates thereafter.

With reference again to operation 501, when a label of normal operation is absent for the inertial reference data, the process sends the inertial reference data as received without replacing the magnetic navigation data (operation 503). The process terminates thereafter.

Turning now to FIG. 6, an illustration of a flowchart of a process for determining replacement magnetic navigation data is depicted in accordance with an illustrative embodiment. The process illustrated in FIG. 6 is an example of one manner in which operation 502 in FIG. 5 can be implemented.

The process begins by identifying the current position of the aircraft (operation 600). The current position of aircraft can be identified using the inertial reference data received from the inertial reference unit. In another example, the current position can be identified using another device or system, such as a global positioning system (GPS) receiver.

The process identifies an adjustment value for magnetic navigation data from magnetic declination data (operation 602). The magnetic declination data can be indexed by current position. In this illustrative example, different positions on the Earth can have different adjustments over time for the difference between true north and a magnetic north. This difference can be an angle that is applied to the magnetic navigation data received in inertial reference data from the inertial reference unit.

The process determines the replacement magnetic navigation data using the true navigation data received in the inertial reference data, the current position of the aircraft, and magnetic declination data describing angle variations between a true north and a magnetic north for different locations on Earth (operation 604). For example, an adjustment value in the magnetic declination data can be identified for the current position of the aircraft. The adjustment value is an angle that is added to the true heading and the true track to obtain a replacement magnetic heading and a replacement magnetic track. The process terminates thereafter.

With reference next to FIG. 7, an illustration of a flowchart of a process for decoding data bus signals is depicted in accordance with an illustrative embodiment. This process can be implemented in magnetic declinator unit 228 in FIG. 2. This decoding is performed to obtain inertial reference data transmitted as data bus signals from an inertial reference unit.

The process begins receiving data bus signals from the inertial reference unit (operation 700). These data bus signals are received from inertial reference units before the data bus signals are sent onto an avionics data bus. In other words, operation 700 intercepts the data bus signals prior to transmission onto the avionics data bus.

The process decodes the data bus signals to obtain the inertial reference data (operation 702). The process terminates thereafter. The inertial reference data can now be the processed to provide updates to the magnetic navigation data in the inertial reference data.

With reference next to FIG. 8, an illustration of a flowchart of a process for encoding data bus signals is depicted in accordance with an illustrative embodiment. This process can be implemented in magnetic declinator unit 228 in FIG. 2. This process is performed to encode adjusted inertial reference data into adjusted data bus signals that are sent to aircraft systems for use in operating the aircraft. This process is an example of one implementation of operation 506 in FIG. 5.

The process begins by identifying the adjusted inertial reference data for transmission (operation 800). In this illustrative example, the adjusted inertial reference data can be located in a data block received from the inertial reference unit that has been adjusted to provide corrected or more accurate magnetic navigation data.

The process begins by encoding the adjusted inertial reference data to form adjusted data bus signals (operation 802). The source destination identifier (SDI) used by the inertial reference unit is used so that aircraft systems see the data as coming from the inertial reference unit. The process sends the adjusted data bus signals onto an avionics data bus connected to the number of aircraft systems in the aircraft that use the adjusted inertial reference data during operation of the aircraft (operation 804). The process terminates thereafter.

Figure 9:
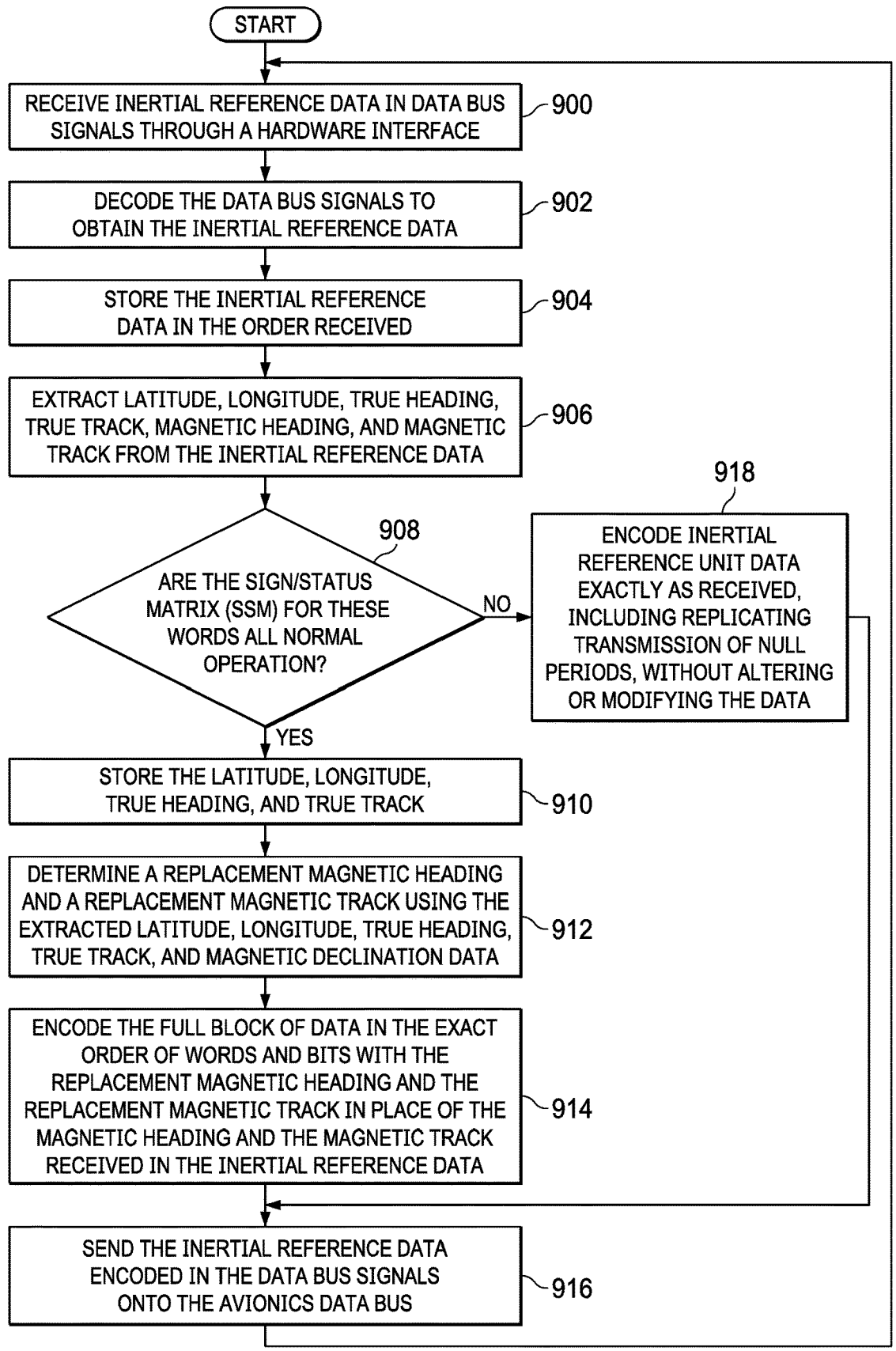
FIG. 9 is an illustration of a flowchart of a process for providing inertial reference data in accordance with an illustrative embodiment.

Turning next to FIG. 9, an illustration of a flowchart of a process for providing inertial reference data is depicted in accordance with an illustrative embodiment. This process can be implemented in magnetic declinator unit 228 in FIG. 2.

The process begins by receiving inertial reference data in data bus signals through a hardware interface (operation 900). In operation 900, the hardware interface can be, for example, input data bus interface 302 in FIG. 3. In this example, the format can be ARINC 429 data transmission protocol which data encoding uses a complementary differential bipolar return-to-zero (BPRZ) transmission waveform.

The process decodes the data bus signals to obtain the inertial reference data (operation 902). The process stores the inertial reference data in the order received (operation 904). In operation 904, the inertial reference data can be received in the form of blocks of data in which each block of data has words, such as words 402 for block of data 400 in FIG. 4.

For example, magnetic declinator unit stores entire blocks of data received, while maintaining the integrity and order of all data transmitted by the inertial reference unit. The blocks of data are stored such that the blocks of data can be encoded and sent onto the avionics data bus in a manner that is transparent to the destination aircraft systems. The sequence of the blocks of data and the order of words in the blocks of data are maintained.

In other words, all data is maintained by the magnetic declinator unit exactly as received, including when the same data words/labels are repeated within the data block. The magnetic declinator unit stores all ones and zeroes transmitted, preserving the exact order for post processing transmission onto the avionics data bus. The magnetic declinator unit also tracks periods of NULL states (0 volts), to later duplicate the NULL periods exactly as received from the inertial reference unit.

The process extracts latitude, longitude, true heading, true track, magnetic heading, and magnetic track from the inertial reference data (operation 906). In operation 906, the magnetic declinator unit identifies words that contain the labels for data to be extracted from the inertial reference unit data. Examples of these labels are described with respect to FIG. 4.

The process determines whether the sign/status matrix (SSM) for these words are all normal operation (operation 908).

If all of the sign/status matrix (SSM) for these words are all normal operation, the process stores the latitude, longitude, true heading, and true track (operation 910). In operation 910, this data is stored for use in computing replacement magnetic track and magnetic heading labels and the latest and most recent values of latitude, longitude, true track and true north in the data block received from the inertial reference unit.

For example, a block of words may contain multiple words of latitude, longitude, true track and true heading for increased data sampling. In this case, the magnetic declinator unit stores and uses values extracted just prior to receiving a magnetic track or magnetic heading label within the block of words. If magnetic track and magnetic heading are also in the block of words multiple times, the magnetic declinator unit again uses the most recent values of latitude, longitude, true track and true heading received. This process ensures that the magnetic declinator unit uses the most current latitude, longitude, true track or true heading values transmitted in the block of words in computations to determine replacement magnetic heading and replacement magnetic track.

The process determines a replacement magnetic heading and a replacement magnetic track using the extracted latitude, longitude, true heading, true track, and magnetic declination data (operation 912). In operation 912, the process identifies a declination angle from the magnetic declination data. The declination angle is identified using the current position of the aircraft as indicated by the extracted latitude and longitude. For positions in between points in the magnetic declination data, the process uses interpolation, or some other suitable technique.

In this example, the magnetic declination data includes at least one of a World Magnetic Model (WMM) or an International Geomagnetic Reference Field (IGRF) model, both available from the National Oceanic, and an Atmosphere Administration (NOAA). The resolution is selected such that the data points meet or exceed the accuracy requirements of the replacement magnetic heading and the replacement magnetic track.

The process then encodes the full block of data in the exact order of words and bits with the replacement magnetic heading and the replacement magnetic track in place of the magnetic heading and the magnetic track received in the inertial reference data (operation 914). In operation 914, the process encodes the inertial reference unit data exactly as received, including replicating transmission of NULL periods, with the exception of replacing the magnetic track and magnetic heading data received with replacement magnetic heading and replacement magnetic track.

The process sends the inertial reference data encoded in the data bus signals onto the avionics data bus (operation 916). The process returns to operation 900 to receive additional inertial reference data in data bus signals from the inertial reference unit. The transmission is such that the adjustment of the inertial reference data is transparent to the aircraft systems that use the data.

With reference again to operation 908, if the sign/status matrix (SSM) for these words are not all normal operation, the process encodes inertial reference unit data exactly as received, including replicating transmission of NULL periods, without altering or modifying the data (operation 918). The process then proceeds to operation 916 as described above.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 10:
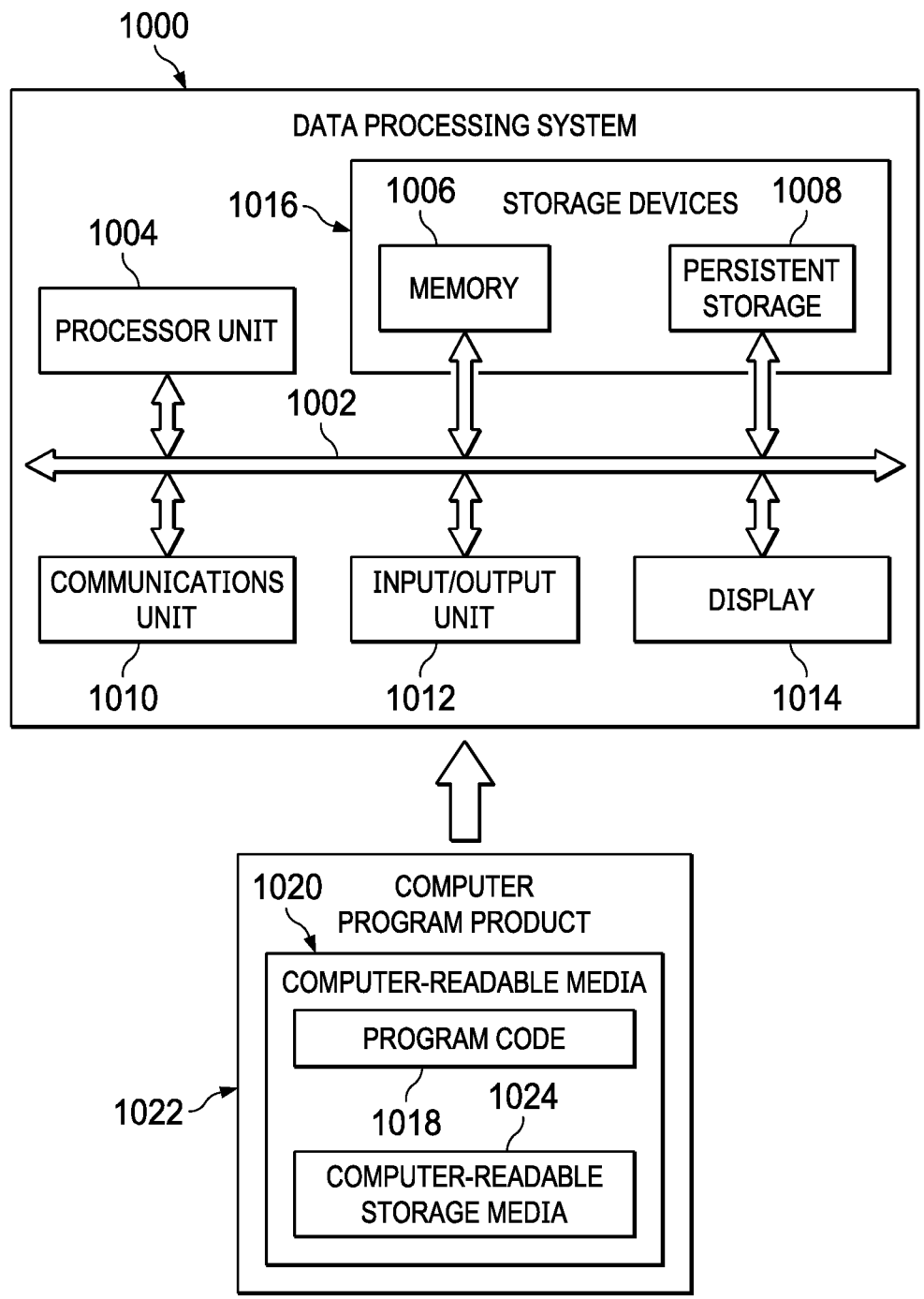
FIG. 10 is an illustration of a block diagram of a data processing system in accordance with an illustrative embodiment.

Turning now to FIG. 10, an illustration of a block diagram of a data processing system is depicted in accordance with an illustrative embodiment. Data processing system 1000 can be used to implement computer system 227 in FIG. 2. In this illustrative example, data processing system 1000 includes communications framework 1002 (e.g. an interconnect network or bus), which provides communications between processor unit 1004, memory 1006, and persistent storage 1008, communications unit 1010, input/output (I/O) unit 1012, and display 1014. In this example, communications framework 1002 takes the form of a data bus system.

Processor unit 1004 serves to execute instructions for software that can be loaded into memory 1006. Processor unit 1004 includes one or more processors. For example, processor unit 1004 can be selected from at least one of a multicore processor, a central processing unit (CPU), a graphics processing unit (GPU), a physics processing unit (PPU), a digital signal processor (DSP), a network processor, or some other suitable type of processor.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, can be, for example, a random-access memory or any other suitable volatile or non-volatile storage device. Persistent storage 1008 can take various forms, depending on the particular implementation.

For example, persistent storage 1008 may contain one or more components or devices. For example, persistent storage 1008 can be a hard drive, a solid-state drive (SSD), a flash memory, a rewritable optical disk, a rewritable magnetic tape, or some combination of the above. The media used by persistent storage 1008 also can be removable. For example, a removable hard drive can be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that can be connected to data processing system 1000. For example, input/output unit 1012 can provide a connection for user input through at least one of a keyboard, a mouse, or some other suitable input device. Further, input/output unit 1012 can send output to a printer or to an external storage device. Display 1014 provides a mechanism to display information to a user.

Instructions for at least one of the operating system, applications, or programs can be located in storage devices 1016, which are in communication with processor unit 1004 through communications framework 1002. The processes of the different embodiments can be performed by processor unit 1004 using computer-implemented instructions, which can be located in a memory, such as memory 1006.

These instructions are referred to as program code, computer usable program code, or computer-readable program code that can be read and executed by a processor in processor unit 1004. The program code in the different embodiments can be embodied on different physical or computer-readable storage media, such as memory 1006 or persistent storage 1008.

Program code 1018 is located in a functional form on computer-readable media 1020 that is selectively removable and can be loaded onto or transferred to data processing system 1000 for execution by processor unit 1004. Program code 1018 and computer-readable media 1020 form computer program product 1022 in these illustrative examples. In this illustrative example, computer-readable media 1020 is computer-readable storage media 1024.

In these illustrative examples, computer-readable storage media 1024 is a physical or tangible storage device used to store program code 1018 rather than a medium that propagates or transmits program code 1018.

Alternatively, program code 1018 can be transferred to data processing system 1000 using a computer-readable signal media. The computer-readable signal media can be, for example, a propagated data signal containing program code 1018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1000 are not meant to provide architectural limitations to the manner in which different embodiments can be implemented. In some illustrative examples, one or more of the components may be incorporated in or otherwise form a portion of, another component. For example, memory 1006, or portions thereof, can be incorporated in processor unit 1004 in some illustrative examples. The different illustrative embodiments can be implemented in a data processing system including components in addition to or in place of those illustrated for data processing system 1000. Other components shown in FIG. 10 can be varied from the illustrative examples shown. The different embodiments can be implemented using any hardware device or system capable of running program code 1018.

Figure 11:
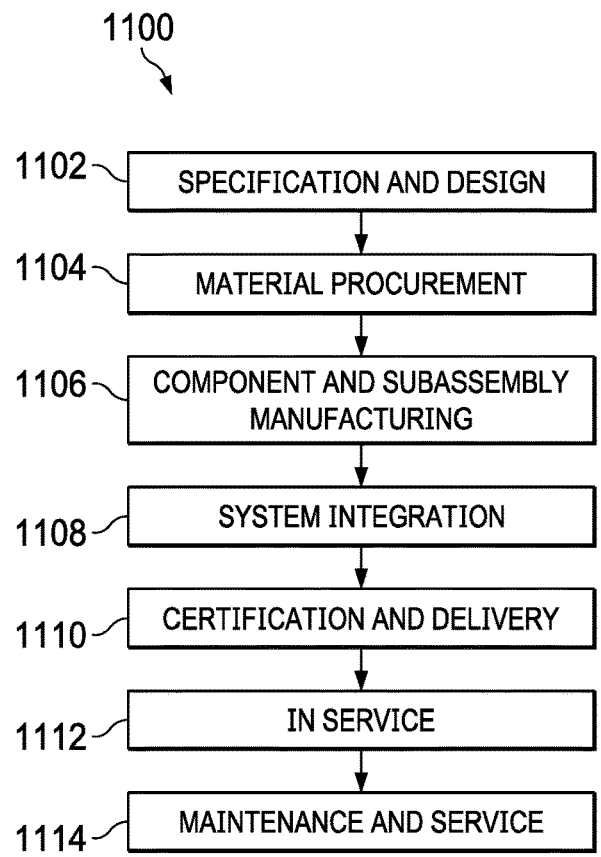
FIG. 11 is an illustration of a block diagram of an aircraft manufacturing and service method in accordance with an illustrative embodiment.
Figure 12:
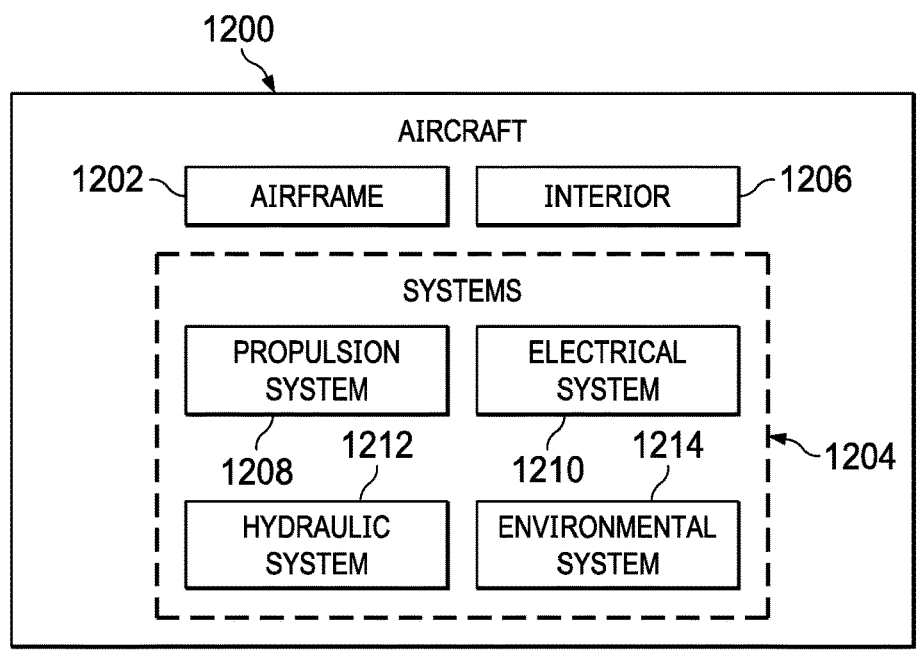
FIG. 12 is an illustration of a block diagram of an aircraft in which an illustrative embodiment may be implemented.

Illustrative embodiments of the disclosure may be described in the context of aircraft manufacturing and service method 1100 as shown in FIG. 11 and aircraft 1200 as shown in FIG. 12. Turning first to FIG. 11, an illustration of a block diagram of an aircraft manufacturing and service method is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 in FIG. 12 can go through certification and delivery 1110 in order to be placed in service 1112. While in service 1112 by a customer, aircraft 1200 in FIG. 12 is scheduled for routine maintenance and service 1114, which may include modification, reconfiguration, refurbishment, and other maintenance or service.

For example, a magnetic declinator unit can be installed into aircraft 1200 during different steps in an aircraft manufacturing and service method 1100. For example, a magnetic declinator unit can be installed during system integration 1108. Additionally, magnetic declinator unit can be installed as upgrade, refurbishment, or reconfiguration of aircraft 1200 during maintenance and service 1114. The use of the magnetic declinator unit in an aircraft 1200 during in service 1112 can enable more accurate navigation of aircraft 1200 through providing magnetic navigation data that can be more accurate than the magnetic navigation data provided by the inertial reference system.

Each of the processes of aircraft manufacturing and service method 1100 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of a block diagram of an aircraft is depicted in which an illustrative embodiment may be implemented. In this example, aircraft 1200 is produced by aircraft manufacturing and service method 1100 in FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as the automotive or nautical industry.

Apparatuses and methods embodied herein may be employed during at least one of the stages of aircraft manufacturing and service method 1100 in FIG. 11.

In one illustrative example, components or subassemblies produced in component and subassembly manufacturing 1106 in FIG. 11 can be fabricated or manufactured in a manner similar to components or subassemblies produced while aircraft 1200 is in service 1112 in FIG. 11. As yet another example, one or more apparatus embodiments, method embodiments, or a combination thereof can be utilized during production stages, such as component and subassembly manufacturing 1106 and system integration 1108 in FIG. 11. One or more apparatus embodiments, method embodiments, or a combination thereof may be utilized while aircraft 1200 is in service 1112, during maintenance and service 1114 in FIG. 11, or both. The use of a number of the different illustrative embodiments may substantially expedite the assembly of aircraft 1200, reduce the cost of aircraft 1200, or both expedite the assembly of aircraft 1200 and reduce the cost of aircraft 1200.

Thus, illustrative examples provide a method, apparatus, and system to adjust inertial reference data. The inertial reference data is received from an inertial reference unit in an aircraft. Replacement magnetic navigation data is determined for the aircraft at a current position of the aircraft. Magnetic navigation data in the inertial reference data is replaced with the replacement magnetic navigation data for the aircraft to form adjusted inertial reference data. The adjusted inertial reference data is sent to a number of aircraft systems that use the adjusted inertial reference data during operation of the aircraft.

One or more illustrative examples provide a technical solution are present that overcome a technical problem with the accuracy of magnetic navigation data calculated by inertial reference units. As a result, one or more illustrative examples determine magnetic navigation data in a magnetic declinator located outside of an inertial reference unit. Determination of the magnetic navigation data is performed using inertial reference data received from the inertial reference unit and magnetic declination data stored in the magnetic declinator unit. The updating of magnetic declination data can be performed without removing inertial reference units and sending the inertial reference units to a supplier for updating. The updating of magnetic declination data can be performed without updating inertial reference units on the aircraft. The updating of magnetic declination data can be performed without needing to change aircraft wiring.

The magnetic declinator unit in the illustrative examples is located between the inertial reference unit and the aircraft systems that use the inertial reference data. For example, the magnetic declinator unit receives the inertial reference data in the inertial reference units that is intended for transmission on an avionics data bus. The magnetic declinator unit decodes the data and determines magnetic navigation data that replaces the original magnetic navigation data in the inertial reference data. This adjusted inertial reference data is then encoded back into the original form for transmission onto the avionics data bus to the different aircraft systems. In this manner, the replacement of the magnetic navigation data is performed transparently in a manner that does not affect the operation of the inertial reference unit and the aircraft systems.

Thus, the magnetic declinator unit in the illustrative examples, provides a mechanism for older inertial reference units that do not have inertial reference unit magnetic variation table updates available to become compliant within the heading accuracy requirements for magnetic north based operations. Without the magnetic declinator unit, aircraft with these out-of-date inertial reference units are currently limited to operate in geographical areas where the variation from the magnetic north calculated by these inertial reference units are outside limits set by various governmental entities, such as the Federal Aviation Administration (FAA).

Additionally, the magnetic declinator unit eliminates the need for an aircraft program pin wiring change in connection to the inertial reference unit.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. An inertial reference system comprising:
   a magnetic declinator unit, wherein the magnetic declinator unit:
      receives inertial reference data from an inertial reference unit in the inertial reference system in an aircraft, wherein the inertial reference data includes magnetic declination data for a current position of the aircraft;
      determines replacement magnetic declination data for the current position of the aircraft from data previously stored within the aircraft;
      replaces the magnetic declination data of the inertial reference data with the replacement magnetic declination data to form replacement magnetic navigation data for the aircraft at the current position of the aircraft;
      replaces magnetic navigation data in the inertial reference data with the replacement magnetic navigation data for the aircraft to form adjusted inertial reference data; and
      sends the adjusted inertial reference data to a number of aircraft systems that use the adjusted inertial reference data during operation of the aircraft.

2. The inertial reference system of claim 1, wherein the magnetic declinator unit is located between the inertial reference unit and an avionics data bus,
   wherein the magnetic declinator unit:
      receives data bus signals from the inertial reference unit; and
      decodes the data bus signals to obtain the inertial reference data, and
   wherein in sending the adjusted inertial reference data to the number of aircraft systems that use the adjusted inertial reference data during operation of the aircraft, the magnetic declinator unit:
      encodes the adjusted inertial reference data to form adjusted data bus signals; and
      sends the adjusted data bus signals onto the avionics data bus connected to the number of aircraft systems in the aircraft that use the adjusted inertial reference data during operation of the aircraft.

3. The inertial reference system of claim 2, wherein the avionics data bus is selected from the group consisting of an ARINC 429 data bus and a MIL-STD-1553 data bus.

4. The inertial reference system of claim 1, wherein in receiving inertial reference data from the inertial reference unit in the aircraft, the magnetic declinator unit:
   receives data bus signals from the inertial reference unit; and
   decodes the data bus signals to obtain the inertial reference data.

5. The inertial reference system of claim 1, wherein
   the replacement magnetic navigation data is determined using true navigation data, the current position of the aircraft, and the replacement magnetic declination data describing angle variations between a true north and a magnetic north for different locations on Earth.

6. The inertial reference system of claim 5, wherein the replacement magnetic declination data comprises at least one of a World Magnetic Model or an International Geomagnetic Reference Field model.

7. The inertial reference system of claim 5, wherein the replacement magnetic navigation data comprises a replacement magnetic heading and a replacement magnetic track and wherein the true navigation data comprises a true heading and a true track.

8. The inertial reference system of claim 1, wherein the inertial reference data comprises a current latitude, a current longitude, a true track, a true heading, a magnetic heading, and a magnetic track.

9. The inertial reference system of claim 1, wherein the magnetic declinator unit:
   determines whether the inertial reference data is labeled as normal operation; and
   when the inertial reference data is labeled as normal operation, the magnetic declinator unit includes the replacement magnetic declination data; and
      determines the replacement magnetic navigation data for the aircraft at the current position of the aircraft;
      replaces the magnetic navigation data in the inertial reference data with the replacement magnetic navigation data for the aircraft to form the adjusted inertial reference data; and
      sends the adjusted inertial reference data to the number of aircraft systems that use the adjusted inertial reference data during operation of the aircraft.

10. The inertial reference system of claim 1, wherein the magnetic declinator unit sends the inertial reference data as received without a change when a label of normal operation is absent for the magnetic navigation data in the inertial reference data.

11. The inertial reference system of claim 1, wherein the magnetic declinator unit comprises a housing and wherein the housing includes an input data bus interface connected to the inertial reference unit and an output data bus interface configured to connect to an avionics data bus of the number of aircraft systems.

12. The inertial reference system of claim 1, wherein the magnetic declinator unit comprises a housing and wherein the housing includes a communications interface configured to receive the replacement magnetic declination data.

13. An aircraft magnetic declinator system comprising:
   an input data bus interface that is connectable to an output of an inertial reference unit in an aircraft, wherein the input data bus interface receives a complementary differential bipolar return-to-zero transmission waveform;
   an output data bus interface that is connectable to an avionics data bus in the aircraft; and
   a controller that:
      decodes the complementary differential bipolar return-to-zero transmission waveform to obtain inertial reference data comprising a current position of the aircraft, a true heading, a true track, a magnetic heading, and a magnetic track, wherein the magnetic heading and the magnetic track are determined using magnetic declination data for the current position of the aircraft;
      determines replacement magnetic declination data for the current position of the aircraft from data previously stored within the aircraft;
      determines a replacement magnetic heading and a replacement magnetic track using the replacement magnetic declination data for the current position of the aircraft;
      replaces the magnetic heading and the magnetic track with the replacement magnetic heading and the replacement magnetic track to form adjusted inertial reference data;

encodes the adjusted inertial reference data to form an adjusted complementary differential bipolar return-to-zero transmission waveform; and sends the adjusted complementary differential bipolar return-to-zero transmission waveform onto the avionics data bus in the aircraft.

14. The aircraft magnetic declinator system of claim 13, wherein the inertial reference data is organized into blocks of data and the controller stores the blocks of data, wherein the controller:

encodes a block of data with the replacement magnetic heading and the replacement magnetic track in place of the magnetic heading and the magnetic track in the block of data.

15. The aircraft magnetic declinator system of claim 14, wherein in encoding the inertial reference data, the controller:

encodes the block of data containing the replacement magnetic heading and the replacement magnetic track to form the adjusted differential bipolar return-to-zero (BPRZ) transmission waveform.

16. The aircraft magnetic declinator system of claim 13, wherein in determining the replacement magnetic heading and the replacement magnetic track using the current position of the aircraft, the controller:

determines the replacement magnetic heading and the replacement magnetic track using the true heading, the true track, the current position of the aircraft, and the replacement magnetic declination data describing angle variations between a true north and a magnetic north for locations on Earth.

17. The aircraft magnetic declinator system of claim 16, wherein the replacement magnetic declination data comprises at least one of a World Magnetic Model or an International Geomagnetic Reference Field model.

18. The aircraft magnetic declinator system of claim 13, wherein the avionics data bus is selected from the group consisting of an ARINC 429 data bus and a MIL-STD-1553 data bus.

19. A method for adjusting inertial reference data comprising:

receiving the inertial reference data from an inertial reference unit in an aircraft, wherein the inertial reference data includes magnetic declination data for a current position of the aircraft;

determining replacement magnetic declination data for the current position of the aircraft from data previously stored within the aircraft;

replacing the magnetic declination data of the inertial reference data with the replacement magnetic declination data to form replacement magnetic navigation data for the aircraft at the current position of the aircraft;

replacing magnetic navigation data in the inertial reference data with the replacement magnetic navigation data for the aircraft to form adjusted inertial reference data; and sending the adjusted inertial reference data to a number of aircraft systems that use the adjusted inertial reference data during operation of the aircraft.

20. The method of claim 19, wherein receiving the inertial reference data from the inertial reference unit in the aircraft comprises:

receiving data bus signals from the inertial reference unit;

decoding the data bus signals to obtain the inertial reference data; and wherein sending the adjusted inertial reference data to the number of aircraft systems that use the adjusted inertial reference data during operation of the aircraft comprises:

encoding the adjusted inertial reference data to form adjusted data bus signals; and sending the adjusted data bus signals onto an avionics data bus connected to the number of aircraft systems in the aircraft that use the adjusted inertial reference data during operation of the aircraft.

21. The method of claim 20, wherein the avionics data bus is selected from the group consisting of an ARINC 429 data bus and a MIL-STD-1553 data bus.

22. The method of claim 19, wherein the replacement magnetic navigation data is formed using a true navigation data, the current position of the aircraft, and the replacement magnetic declination data describing angle variations between a true north and a magnetic north for different locations on Earth.

23. The method of claim 22, wherein the replacement magnetic declination data comprises at least one of a World Magnetic Model or an International Geomagnetic Reference Field model.

24. The method of claim 22, wherein the replacement magnetic navigation data comprises a replacement magnetic heading and a replacement magnetic track and wherein the true navigation data comprises a true heading and a true track.

25. The method of claim 19, wherein the inertial reference data comprises a current latitude, a current longitude, a true track, a true heading, a magnetic heading, and a magnetic track.

26. The method of claim 19 further comprising:

determining whether the inertial reference data is labeled as normal operation; and when the inertial reference data is labeled as normal operation, determining the replacement magnetic navigation data for the aircraft at the current position of the aircraft comprises:

replacing the magnetic navigation data in the inertial reference data with the replacement magnetic navigation data for the aircraft to form the adjusted inertial reference data; and sending the adjusted inertial reference data to the number of aircraft systems that use the adjusted inertial reference data during operation of the aircraft.

27. The method of claim 19 further comprising:

sending the inertial reference data as received without replacing the magnetic navigation data when a label of normal operation is absent for the magnetic navigation data in the inertial reference data.

* * * * *